Nov. 1, 1932.  G. N. CADBURY  1,885,588
BRAKE CONTROL
Filed Feb. 9, 1931
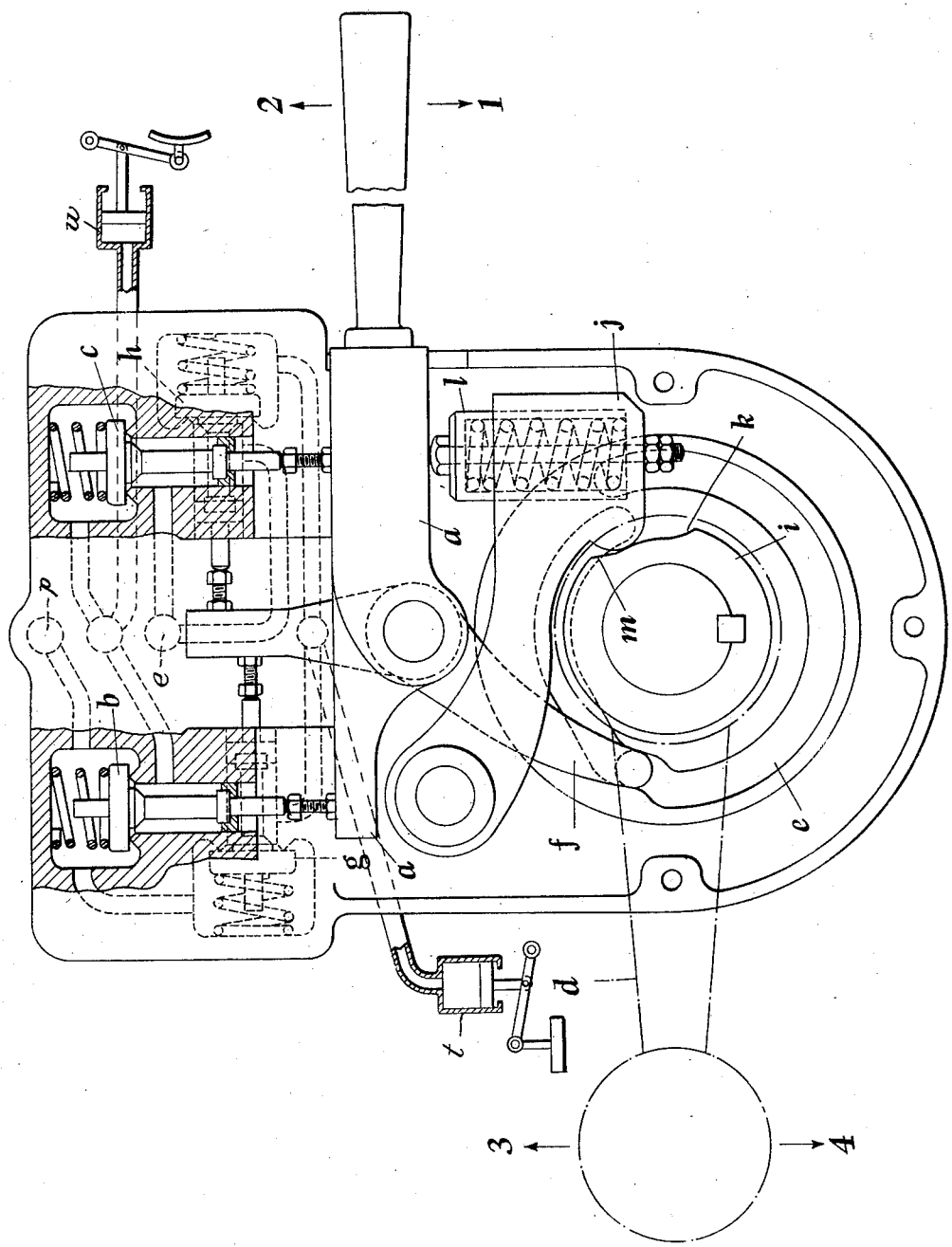

Patented Nov. 1, 1932

1,885,588

UNITED STATES PATENT OFFICE

GEORGE NORMAN CADBURY, OF WEST BROMWICH, ENGLAND

BRAKE CONTROL

Application filed February 9, 1931, Serial No. 514,608, and in Great Britain March 27, 1930.

This invention relates primarily to brakes for tramway vehicles, but is applicable to other rolling stock. It is common practice to provide tramway vehicles with air brakes acting on the wheels and rails, and with electric brakes which depend on the rotation of the wheels, the electrical energy generated being either dissipated by a resistance, or utilized in magnetic track brakes.

The object of the present invention is to provide an improved control for a brake system wherein the pneumatic and electric brakes are co-ordinated in a more convenient and effective manner than heretofore.

The invention comprises the combination with pneumatic wheel and track brakes, and an electric brake, of means whereby either or both of the pneumatic brakes can be applied as desired and the wheel brake rendered inactive when the electric brake is brought into use.

In one manner of applying the invention to an electrically driven tramcar, pneumatically operated brake shoes are arranged to operate on the wheels, and pneumatically operated brake shoes are arranged to operate on the track rails. Also a rheostatic brake or a magnetic track brake or both is or are employed.

The control of the air for the wheel brakes is effected by one handle, and the control of the air for the track brakes is preferably effected by what is usually termed the controller handle, that is to say the handle which controls the driving motor or motors and the rheostatic or magnetic brake. In addition the controller handle is adapted in any convenient manner, for example by a cam or other mechanism, to release the air from the wheel brakes when the electric brake is applied. Further the controller handle is utilized in any convenient manner to release both the wheel and track pneumatic brakes before or when the handle is moved in the direction for supplying electric current to the driving motors.

The pneumatic wheel brakes may be employed for ordinary service stops. The action of the wheel brakes may be supplemented by moving the controller handle from the "off" position to an adjacent position at which air is admitted to the pneumatic track brakes. For emergencies when the full braking effect is required, the controller handle is moved beyond the position at which the pneumatic track brake is brought into action, and is thereby caused to bring the electric brake into action. Seeing that the latter brake, whether it be a rheostatic or a magnetic track brake, depends on the rotation of the wheels, it is important to release the pneumatic wheel brakes if they have previously been applied. Therefore the controller handle in addition to bringing the electric brake into action also releases the pneumatic wheel brakes, or renders the same inactive, by opening an air release valve or valves. The pneumatic track brakes, however, remain in action.

In the example illustrated by the accompanying drawing, which is a plan showing diagrammatically the relation of the various levers, valves and brakes, $a$ is a hand lever which when moved in the direction of the arrow 1 operates the valve $b$ and admits air from the pressure pipe $p$ to the wheel brake $w$, not shown, and when moved in the direction of the arrow 2 operates the valve $c$ which releases air from the wheel brake to the atmospheric pipe $a$. The hand lever $d$ is the usual handle of the electric controller which controls the supply of electric current to the driving motors of the vehicle and also controls the electric brake. Coaxially with the axis of rotation of this handle is secured to it a cam $e$ formed with a groove which engages one end of a lever $f$ arranged to operate the valves of the air track brake $t$. Movement of this handle in the direction of the arrow 3, causes current to be supplied to the driving motors, and movement in the direction of the arrow 4 brings the electric brake into action. When the hand lever $d$ is in the position shown, the valve $g$ which admits air from the pressure pipe $p$ to the track brake and the valve $h$ which releases air from the track brake to the atmosphere are both closed. The first effect of moving the lever in the direction of the arrow 4 is to open the valve $g$ and so bring the track brake into action. A further movement in the same direction causes the electric brake to be applied. In conjunction with the cam $e$ is arranged another cam $i$ adapted to act on a lever $j$ which can operate the hand lever $a$ of the air wheel brake. The disposition of this cam is such that when or immediately before the hand lever $d$ reaches the first position at which the electric brake is applied, the part $k$ of the cam moves the lever $j$ and causes the lever $a$ to open the release valve $c$. Movement is transmitted from $j$ to $a$ through a spring plunger $l$. When the lever $d$ is moved from the position shown in the direction of the arrow 3, the first effect is to move the lever $f$ in the direction for opening the air track brake release valve $h$. Also the part $m$ of the cam $i$ by acting on the lever $j$ opens the release valve $c$ of the air wheel brake. The spring plunger serves the further purpose that it allows the wheel brake handle $a$ to be operated by hand without obstruction from the lever $j$. Consequently in the event of failure of the electric brake after the lever $d$ has been moved in the direction for applying the electric brake, or jamming of the mechanism actuated by the lever $d$, it is still possible to apply the hand brake.

By this invention I enable the driver to make the best use of the brakes in a very simple and convenient manner. The invention is not limited to any particular subordinate details as these may be varied to suit different requirements.

Having thus described my invention what I claim as new and desire to secure by Letters Patent is:—

1. In brakes for tramway vehicles and other rolling stock having pneumatic wheel and track brakes and an electric brake, the combination of valves for admitting air to and releasing air from the wheel brake, valves for admitting air to and releasing air from the track brake, a hand lever acting on the wheel brake valves, a hand lever acting on the electric brake, a lever acting on the track brake valves, a cam connected with the electric brake lever and engaging the track brake valve lever, an intermediate lever for transmitting releasing motion from the electric brake lever to the wheel brake valve lever, and a spring interposed between the latter lever and the intermediate lever.

2. In brakes for tramway vehicles and other rolling stock having pneumatic wheel and track brakes, and an electric brake, the combination of valves for admitting air to and releasing air from the wheel brake, valves for admitting air to and releasing air from the track brake, a hand lever acting on the wheel brake valves, a hand lever acting on the electric brake, a lever acting on the track brake valves, a pair of cams connected with the electric brake lever, one of them engaging the track brake valve lever, an intermediate lever engaging the other cam for transmitting releasing motion to the wheel brake valve lever, and a spring device interposed between the latter lever and the intermediate lever, substantially as described.

3. In brakes for tramway vehicles and other rolling stock having pneumatic wheel and track brakes, and a controller for the electric driving motors and electric brake, the combination of valves for admitting air to and releasing air from the wheel brake, valves for admitting air to and releasing air from the track brake, a hand lever acting on the wheel brake valves, a hand lever acting on the controller, a lever acting on the track brake valves, a pair of cams connected with the controller hand lever, one of them engaging the track brake valve lever, an intermediate lever engaging the other cam for transmitting releasing motion to the wheel brake valve lever, a movable abutment carried on the intermediate lever, and a spring on the intermediate lever holding the abutment in contact with the wheel brake valve lever, substantially as described.

In testimony whereof I have signed my name to this specification.

GEORGE NORMAN CADBURY.